July 11, 1950        F. A. GROSS        2,514,948
WIND VELOCITY INDICATOR
Filed June 27, 1945
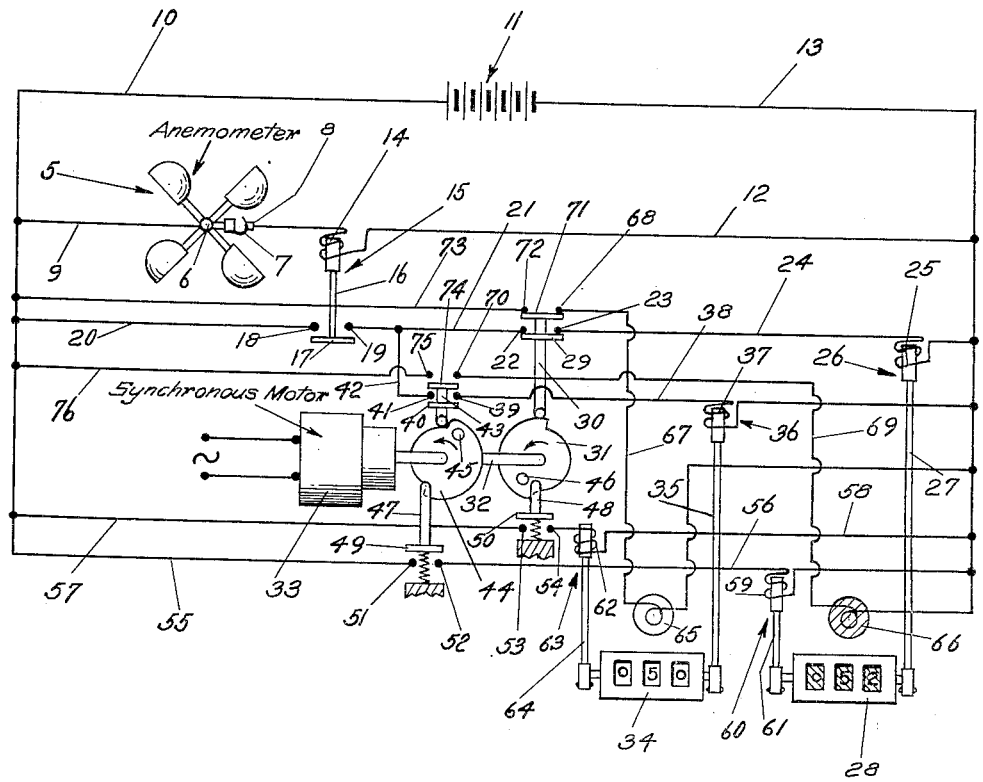
Inventor,
Fritz A. Gross
By Elmer J. Goen
Attorney Patented July 11, 1950

2,514,948

UNITED STATES PATENT OFFICE 2,514,948

WIND VELOCITY INDICATOR

Fritz A. Gross, Weston, Mass., assignor to Raytheon Manufacturing Company, Newton, Mass., a corporation of Delaware Application June 27, 1945, Serial No. 601,884

6 Claims. (Cl. 73—229)

My present invention relates to wind-velocity indicators.

The main objects of my present invention are to provide improved accuracy and reliability in devices of the general character indicated, and to simplify their construction.

These and other objects of my present invention, which will become more apparent as the detailed description thereof progresses, are attained, briefly, in the following manner:

A wind-driven mechanism, such as a Robinson anemometer, is arranged in an electrical circuit in such a manner that electrical impulses are produced at a rate which is a function of the velocity to be indicated. These impulses are applied, for predetermined time intervals, successively to each of a plurality of relays which are adapted to operate counting devices, whereby the number of such impulses recorded during each such time interval correspond directly to the wind velocity in terms, for example, of miles-per-hour. Provision is made for successively resetting each counting device to zero just prior to the start of its counting period, so that there is continuously before the observer a record of the average velocity during the time interval immediately preceding the instantaneous counting period. Such an indicator is simple in construction, and it has been found to be reliable and accurate in operation.

In the accompanying specification I shall describe, and in the annexed drawing show, an illustrative embodiment of the wind velocity indicator of my present invention.

It is, however, to be clearly understood that I do not wish to be limited to the details herein shown and described for purposes of illustration only, inasmuch as changes therein may be made without the exercise of invention and within the true spirit and scope of the claims hereto appended.

In said drawing, the single figure is a circuit diagram of a wind-velocity indicator assembled in accordance with my present invention.

Referring now more in detail to the aforesaid illustrative embodiment of my present invention, and with particular reference to the drawing illustrating the same, the numeral 5 generally designates a wind-driven mechanism, such as a Robinson anemometer, in which, through appropriate gearing or the like, the complete revolutions of its shaft 6 are made to correspond directly, in terms, for example, of miles-per-hour, to the velocity to be indicated.

I provide the shaft 6 with a spring contact 7 which is adapted to wipingly engage a fixed contact 8 once during each revolution of said shaft, the contact 7 being connected by a branch conductor 9 and a main conductor 10 to one terminal of a source of voltage, for example, a battery 11, and the contact 8 being connected by a branch conductor 12 and a main conductor 13 to the other terminal of said source of voltage.

The branch conductor 12 includes the coil 14 of an electromagnetic control relay 15, the armature 16 of said relay being provided with a switch arm 17 adapted to make and break an electrical circuit between a pair of contacts 18 and 19. The contact 18 is connected by branch conductor 20 to the main conductor 10, and the contact 19 is connected to one end of a branch conductor 21, in turn connected, at its other end, to a contact 22. The latter is adapted to cooperate, in a manner shortly to be described, with a contact 23 which is connected by a branch conductor 24 to the main conductor 13.

The conductor 24 includes the coil 25 of an electro-magnetic counter relay 26 having an armature 27 adapted to actuate a conventional counting device 28, the latter recording each electrical impulse applied to said relay 26.

In order to complete the circuit through the relay 26, I provide a switch arm 29 which is adapted to bridge the contacts 22 and 23, said switch arm being carried by a rod 30. The lower end of the rod 30 cooperates with a cam 31 fixed upon the shaft 32 of a clock type synchronous motor 33 driven from any suitable source of A. C., said cam 31 being cut, for example, so that the contacts 22 and 23 are alternately closed and open for one minute periods.

Thus, assuming that during a given minute the contacts 22 and 23 are closed, the relay 26 is energized every time the contacts 18 and 19 are closed, and the latter are momentarily closed by the relay 15 once for every revolution of the anemometer shaft 6. Therefore, at the end of said given minute, the counter 28 shows the total number of electrical impulses produced during said minute, and this corresponds to the velocity of the wind in miles-per-hour.

In order that the velocity indication be continuous, I provide a second counter device 34 which is adapted to count the electrical impulses produced during the second minute, and, as will later be described, the first counting device 28 is reset to zero just before the end of the counting period of the second counter 34, whereby it is made ready to record the impulses produced during the third minute. In other words, the counting devices 28 and 34 operate alternately.

The counting device 34 is actuated by the armature 35 of a second counter relay 36, the coil 37 of the relay 36 being connected into a branch conductor 38, in turn, connected between the main conductor 13 and a contact 39. The latter is adapted, by means of a switch arm 40, to cooperate with a contact 41 which is connected by a branch conductor 42 to the branch conductor 21, the switch arm 40 being carried by a rod 43 coacting with a cam 44, fixed upon the shaft 32 of the motor 33, in a manner similar to the rod 30 and cam 31, but in phase opposition thereto.

In order to reset the counting devices 28 and 34 to zero just prior to the start of their respective counting periods, I provide the cams 44 and 31 with pins 45 and 46 cooperable, respectively, with spring-pressed plungers 47 and 48 which carry, respectively, switch arms 49 and 50. The switch arm 49 is adapted to bridge contacts 51 and 52, and the switch arm 50 is adapted to bridge contacts 53 and 54.

The contact 51 is connected by a branch conductor 55 to the main conductor 10, and the contact 52 is connected by a branch conductor 56 to the main conductor 13. The contact 53 is connected to the main conductor 10 by a branch conductor 57, and the contact 54 is connected to the main conductor 13 by a branch conductor 58.

The branch conductor 56 includes the coil 59 of an electromagnetic reset relay 60 whose armature 61 actuates the reset mechanism of the counter 28, and the branch conductor 58 includes the coil 62 of an electromagnetic reset relay 63 whose armature 64 actuates the reset mechanism of the counter 34.

While not necessary, I prefer that there be provided some means for indicating which counting device is to be read during any particular time interval. For this purpose, I provide the counting devices 34 and 28, respectively, with electric lamps 65 and 66, the former being connected into a branch conductor 67 connected between the main conductor 13 and a contact 68, and the latter being connected into a branch conductor 69 connected between the main conductor 13 and contact 70.

The circuit through the lamp 65 is controlled by a switch arm 71, carried by the cam-operated rod 30 and adapted to connect between the contact 68 and a contact 72, in turn, connected by a branch conductor 73 to the main conductor 10.

The circuit through the light 66 is controlled by a switch arm 74, carried by the cam-operated rod 43 and adapted to connect between the contact 70 and a contact 75, in turn, connected by a branch conductor 76 to the main conductor 10.

This completes the description of the aforesaid illustrative embodiment of my present invention.

It will be noted from all of the foregoing that I have provided a wind-velocity indicator which is simple in construction and which is accurate and reliable in operation.

Other advantages of the indicators of my present invention will readily occur to those skilled in the art to which the same relates.

What is claimed is:

1. A wind-velocity indicator comprising: wind-operated means for generating electrical impulses at a rate which is a function of the velocity to be indicated; a plurality of impulse-counting devices; means, responsive to electrical impulses, for separately actuating each of said impulse-counting devices; means for applying the electrical impulses generated during consecutive time intervals of predetermined duration, successively to each of said last-named means, whereby said impulse-counting devices are successively actuated to indicate the number of said electrical impulses generated during each of said consecutive time intervals; and means for successively resetting said impulse-counting devices to zero prior to the commencement of their respective impulse-counting periods.

2. A wind-velocity indicator comprising: an anemometer; means, operable by said anemometer, for generating electrical impulses at a rate which is a function of the velocity to be indicated; a plurality of impulse-counting devices; means, responsive to electrical impulses, for separately actuating each of said impulse-counting devices; means for applying the electrical impulses generated during consecutive time intervals of predetermined duration, successively, to each of said last-named means, whereby said impulse-counting devices are successively actuated to indicate the number of said electrical impulses generated during each of said consecutive time intervals; and means for successively resetting said impulse-counting devices to zero prior to the commencement of their respective impulse-counting periods.

3. A wind-velocity indicator comprising: a source of voltage; means for making and breaking an electrical circuit across said source of voltage; an anemometer for operating said last-named means; means, connected into said electrical circuit, and controlled by the operation of said first-named means, for making and breaking a second electrical circuit across said source of voltage and thereby generating electrical impulses at a rate which is a function of the velocity to be indicated; a plurality of impulse-counting devices; means, responsive to electrical impulses, for separately actuating each of said impulse-counting devices; means for applying the electrical impulses generated during consecutive time intervals of predetermined duration, successively to each of said last-named means, whereby said impulse-counting devices are successively actuated to indicate the number of said electrical impulses generated during each of said consecutive time intervals; and means for successively resetting said impulse-counting devices to zero prior to the commencement of their respective impulse-counting periods.

4. A wind-velocity indicator comprising: wind-operated means for generating electrical impulses at a rate which is a function of the velocity to be indicated; a plurality of impulse-counting devices; relays, responsive to electrical impulses, for separately actuating each of said impulse-counting devices; time-controlled means for applying the electrical impulses generated as above successively to energize said relays during consecutive time intervals of predetermined duration, whereby said impulse-counting devices are successively actuated to indicate the number of said electrical impulses generated during each of said consecutive time intervals; and means for successively resetting said impulse-counting devices to zero prior to the commencement of their respective impulse-counting periods.

5. A wind-velocity indicator comprising: an anemometer; means, operable by said anemometer, for generating electrical impulses at a rate which is a function of the velocity to be indicated; a plurality of impulse-counting devices; relays, responsive to electrical impulses, for separately actuating each of said impulse-counting devices; time-controlled means for applying the electrical impulses generated as above successively to energize said relays during consecutive time intervals of predetermined duration, whereby said impulse-counting devices are successively actuated to indicate the number of said electrical impulses generated during each of said consecutive time intervals; and means for successively resetting said impulse-counting devices to zero prior to the commencement of their respective impulse-counting periods.

6. A wind-velocity indicator comprising: a source of voltage; means for making and breaking an electrical circuit across said source of voltage; an anemometer for operating said last-named means; means, connected into said electrical circuit, and controlled by the operation of said first-named means, for making and breaking a second electrical circuit across said source of voltage and thereby generating electrical impulses at a rate which is a function of the velocity to be indicated; a plurality of impulse-counting devices; relays, responsive to electrical impulses, for separately actuating each of said impulse-counting devices; time-controlled means for applying the electrical impulses generated as above successively to energize said relays during consecutive time intervals of predetermined duration, whereby said impulse-counting devices are successively actuated to indicate the number of said electrical impulses generated during each of said consecutive time intervals; and means for successively resetting said impulse-counting devices to zero prior to the commencement of their respective impulse-counting periods.

FRITZ A. GROSS.

REFERENCES CITED

The following references are of record in the file of this patent:

UNITED STATES PATENTS

| Number | Name | Date |
| --- | --- | --- |
| 1,078,206 | Mayer | Nov. 11, 1913 |
| 2,137,443 | Chappell et al. | Nov. 22, 1938 |
| 2,191,955 | Chappell et al. | Feb. 27, 1940 |
| 2,194,237 | Shepard | Mar. 19, 1940 |
| 2,391,601 | Thomas et al. | Dec. 25, 1945 |

FOREIGN PATENTS

| Number | Country | Date |
| --- | --- | --- |
| 372,204 | Great Britain | May 5, 1932 |